United States Patent [19]

Biber et al.

[11] Patent Number: 4,760,469
[45] Date of Patent: Jul. 26, 1988

[54] ELECTRONIC STILL IMAGE CAMERA SYSTEM WITH ENHANCED RESOLUTION

[75] Inventors: Conrad H. Biber, Needham; William T. Maloney, Sudbury, both of Mass.

[73] Assignee: Polaroid Corporation, Cambridge, Mass.

[21] Appl. No.: 874,037

[22] Filed: Jun. 13, 1988

[51] Int. Cl.$^4$ .............................................. H04N 9/79
[52] U.S. Cl. ................................ 358/310; 358/213.19; 360/22; 360/35.1
[58] Field of Search ............... 358/310, 313, 334, 906, 358/909, 134, 213.25, 213.26, 213.29, 213.27; 360/22, 35.1

[56] References Cited

U.S. PATENT DOCUMENTS

| | | | |
|---|---|---|---|
| 4,001,878 | 1/1977 | Weimer | 358/41 |
| 4,163,256 | 7/1979 | Adcock | 358/134 |
| 4,237,383 | 12/1980 | Kosonocky et al. | 250/578 |
| 4,358,786 | 11/1982 | Pfleiderer et al. | 358/310 |
| 4,460,924 | 7/1984 | Lippel | 358/310 |
| 4,472,741 | 9/1984 | Takatsu et al. | 358/213 |
| 4,500,915 | 2/1985 | Koike et al. | 358/44 |

OTHER PUBLICATIONS

"An Electronic Still Camera Technology", by Kentaro Hanma et al., Consumer Products Research Center, Hitachi Ltd.

Primary Examiner—Michael L. Gellner
Assistant Examiner—David M. Gray
Attorney, Agent, or Firm—Edward S. Roman

[57] ABSTRACT

An electronic still image camera and playback system can record image data on the proposed standard 47 mm magnetic floppy disk in a manner whereby the horizontal line resolution of the recorded data is substantially increased by separating alternate groups of image data for recording, respectively, on two tracks of the magnetic media. The two tracks of the image media may be either two adjacent standard tracks or two subtracks confined within the footprint or envelope of the standard track. The image data from the dual tracks is recombined by interleaving to provide a high resolution hard copy print or other visual display. Alternatively, the dual track recorded image data may be retrieved in a conventional manner to provide a conventional low resolution hard copy or other image display.

12 Claims, 2 Drawing Sheets

ELECTRONIC STILL IMAGE CAMERA SYSTEM WITH ENHANCED RESOLUTION

BACKGROUND OF THE INVENTION

1. Field of the Invention

This invention relates generally to a high resolution electronic still image camera and playback system and, more particularly, to an electronic still image camera and playback system of the type which is compatible for use with a standard 47 mm floppy magnetic disk.

2. Description of the Prior Art

Electronic imaging cameras for recording still images are now well known in the art. Such cameras can record a plurality of still images on a single magnetic disk or tape in either analog or digital format for subsequent playback on any well-known cathode ray tube viewing device or for subsequent fixation in a hard copy by any one of a variety of copiers such as photographic, thermal, ink jet, etc. Recently, it has been proposed to standardize the magnetic disk in which still images are recorded to a 47 mm floppy disk. However, the proposed specifications for storing electronic information signals on a 47 mm floppy disk suffer as a result of the luminance video bandwidth being limited to 4.5 MHz. Under this limitation, a proposed standard 47 mm floppy disk is suitable for storing a horizontal scan line of approximately 212 TV lines resolution.

Therefore, it is a primary object of this invention to provide an electronic still image camera and playback system for use with the proposed standard 47 mm floppy disk in which the horizontal line resolution may be substantially increased.

It is a further object of this invention to provide a high resolution electronic still image camera and playback system utilizing the proposed standard 47 mm magnetic floppy disk which may be played back in either a conventional mode or a high resolution mode in which the horizontal line resolution is substantially twice of the conventional mode.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An electronic still image camera and playback system of the type in which image defining electronic information signals may be stored on two tracks of a nonphotographic storage medium comprises a photoresponsive two-dimensional array having a plurality of light sensitive elements or pixels each of which provides an electronic information signal corresponding to the intensity of scene light incident thereto. Means are operatively associated with the photoresponsive array for filtering the scene light incident to each of the light sensitive pixels in a manner whereby each light sensitive pixel in each of a plurality of adjacent select groupings of light sensitive pixels receives scene light filtered at different select ranges of wavelengths. Electronic information signal shifting means operate to transfer the electronic information signals out from the light sensitive pixels in first alternate ones of the select groupings of light sensitive pixels and in second alternate ones of said select groupings of light sensitive pixels wherein said second alternate ones of said groupings of light sensitive pixels are interspaced, respectively, between said first alternate ones of said select groupings of light sensitive pixels. Means are provided for recording the electronic information signals transferred from the first alternate ones of the select groupings of light sensitive pixels by the electronic information signal shifting means onto a first track of the storage medium and for recording the electronic information signals transferred from the second alternate ones of the select groupings of light sensitive pixels by the electronic information signal shifting means onto a second track of the storage medium. Means are provided for retrieving the electronic information signals from the first and second tracks of the storage medium. Second electronic information signal shifting means operate to receive the electronic information signals retrieved from the first and second tracks of the storage medium and combine the retrieved electronic information signals in a manner whereby the electronic information signals corresponding to the light sensitive pixels in the first alternate ones of the select groupings of light sensitive pixels and the electronic information signals corresponding to the light sensitive pixels in the second alternate ones of the select groupings of light sensitive pixels are arranged in the same consecutive order in which the electronic information signals were initially transferred out of the photoresponsive array.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein:

DESCRIPTION OF THE PREFERRED EMBODIMENT

Figure 1:
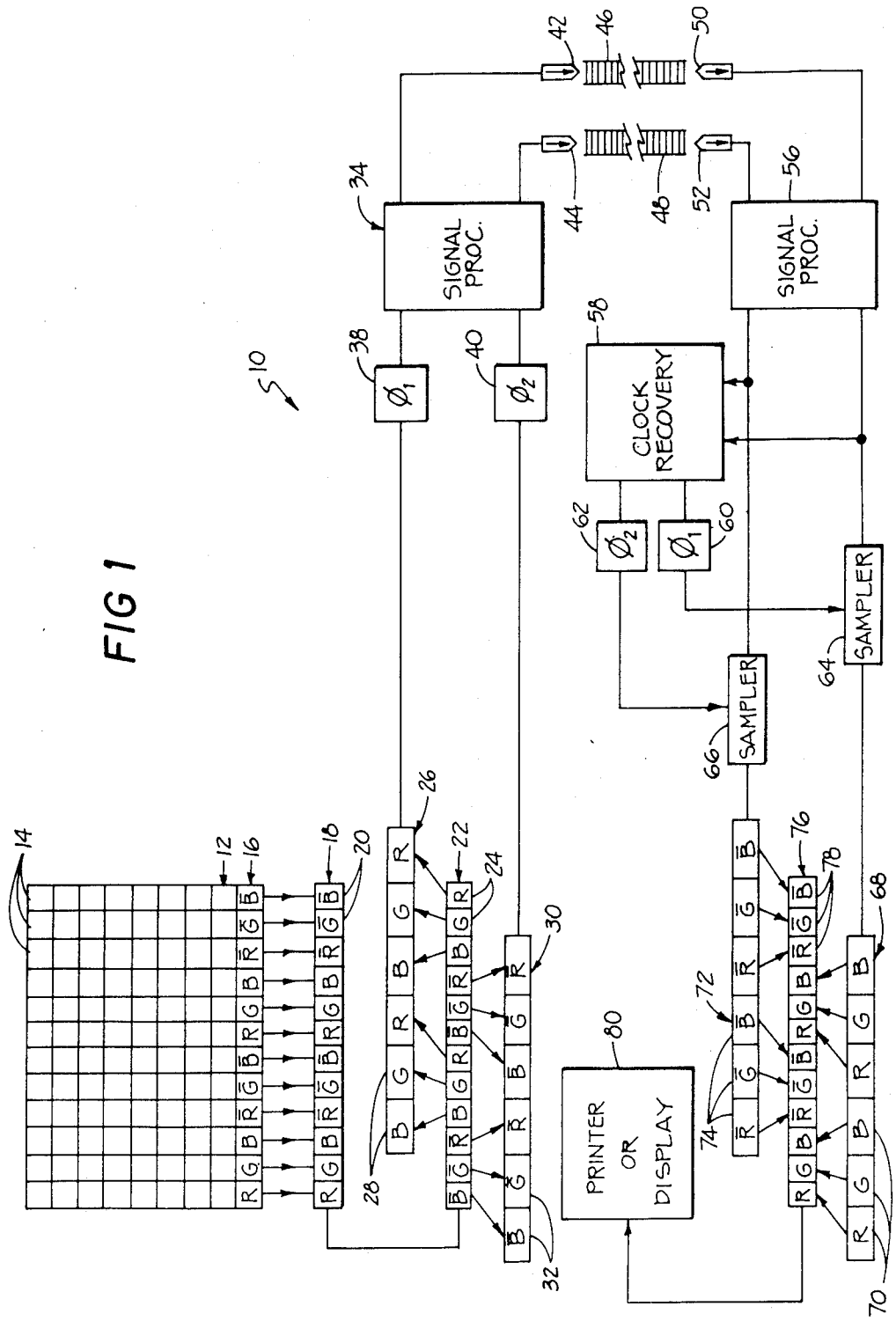
FIG. 1 is a schematic block diagram for the electronic still image camera and playback system of this invention.

Referring to FIG. 1 there is shown a schematic block diagram for the electronic still image camera and playback system of this invention for providing enhanced resolution images. The system comprises a two-dimensional photosensitive array 12 including a plurality of photoresponsive cells or pixels 14 that are arranged in horizontal rows and vertical columns as shown. The photoresponsive array 12 is preferably stationed to receive scene light in a well-known manner by way of a camera objective lens (not shown). The photoresponsive array 12 may comprise a charge coupled device (CCD) which may be either of the frame transfer type or interline transfer type as is again well known in the art. Each of the light sensitive cells or pixels 14 of the photoresponsive array 12 accumulates electrical charge packets in response to incident scene light and thus in this manner provides an electronic information signal corresponding to the intensity of scene light incident thereto.

Scene light incident to each of the light sensitive pixels or cells 14 in the photoresponsive array 12 is filtered in a manner such that each light sensitive pixel or cell 14 in each of a plurality of adjacent select groupings of light sensitive pixels or cells 14 receive scene light filtered at different select ranges of wavelengths. The scene light filtering is provided by filter stripes which overlie the vertical columns of light sensitive pixels or cells 14 in a repeating pattern of red, green and blue stripes. Thus, each select grouping of light sensitive pixels or cells 14 comprises a first cell filtered to receive only the red (R) component of incident scene light, a second cell filtered to receive only the green (G) component of incident scene light, and a third cell filtered to receive only the blue (B) component of incident scene light. Although the select groupings of pixels have been illustrated as comprising pixels or cells arranged in groups of three to receive, respectively, red green and blue (RGB) filtered scene light, it will be readily apparent that such select groupings may comprise more or less light sensitive pixels or cells in the photoresponsive array 12 including only one light sensitive cell and may be filtered to receive any variety of colored light such as the complementary colors cyan, yellow and magenta as well as pastel colors as is well known in the art.

The electronic information signals accumulated by the photoresponsive array 12 in the form of charge packets are frame transferred in a well-known manner to a shift register 18 comprising a plurality of cells 20 linearly arranged and connected with respect to the photoresponsive array 12 to receive the electronic information signals from each horizontal row of light sensitive pixels or cells 14 at a time. The clocking of electronic information signals from the frame transfer photoresponsive CCD array 12 to the shift register 18 is accomplished in a well-known manner by clocking signals which are not shown. The electronic information signals stored by the shift register 18, in turn, are transferred in a serial fashion to a second shift register 22 comprising a plurality of cells 24 arranged in a linear manner. As is readily apparent, the electronic information signals for each horizontal row of the frame transfer photoresponsive array 12 are successively transferred to the shift register 18 and thereafter to the shift register 22.

The shift register 22, in turn, is connected to direct electronic information signals from the first and third groups of red, green and blue (RGB) cells to a shift register 26 comprising a plurality of linearly arranged cells 28. In like manner, the shift register 22 is connected to direct electronic information signals from the second and fourth groups of red, green and blue ($\overline{RGB}$) pixels to a fourth shift register 30 comprising a plurality of linearly arranged cells 32. The shift registers 26 and 30 each comprise half as many cells as the shift register 22 with each of the cells 28 and 32 of the shift registers 26 and 30, respectively, being twice the length of the cells 24 in the shift register 22. Since the shift registers 26 and 30 each comprise half the number of cells of the shift register 22, the electronic information signals corresponding to the alternate groupings of red, green and blue light sensitive pixels can be transferred to the shift registers 26 and 30 without leaving any empty cells.

Thus, in this manner electronic information signals in first alternate ones of the select groupings of red, green and blue (RGB) light sensitive pixels are transferred from the shift register 22 to the shift register 26 while second alternate ones of the select groupings of red, green and blue ($\overline{RGB}$) light sensitive pixels are transferred from the shift register 22 to the shift register 30.

Since the cells 28 of the shift register 26 and the cells 32 of the shift register 30 are twice as long as the cells 24 of the shift register 22, the rate at which data is clocked from the shift register 22 to the shift registers 26 and 30 is substantially half the rate of transfer required to transfer the electronic information signals serially from the shift register 22. This 50% reduction in the rate at which electronic information signals are transferred from the shift register 22 to the shift registers 26 and 30, respectively, permits a 50% reduction in bandwidth thereby allowing the storing of the electronic information signals from the shift register 26 on a first magnetic track having a standard 5 MHz bandwidth and the electronic information signals from the shift register 30 on another magnetic track having a standard 5 MHz bandwidth in a manner as will become readily apparent from the following discussion.

Electronic information signals from the shift register 26, in turn, are transferred in serial fashion by way of a phase shift circuit 38 and a signal processing circuit 34 for recording on a first magnetic track 46 by way of a recording head 42. In like manner the electronic information signals from the shift register 30 are transferred by way of a second phase shift circuit 40 and the signal processing circuit 34 for recording on a second magnetic track 48 by way of a second recording head 44. The phase shift circuits 38 and 40 operate in a well-known manner to insure that the electronic information signals corresponding to adjacent select groupings of red, green and blue pixels are recorded simultaneously on the first and second tracks 46 and 48, respectively. Thus, the electronic information signals from the first select grouping of red, green and blue (RGB) light sensitive pixels from the shift register 26 are delayed sufficiently to be recorded by the recording head 42 onto the magnetic track 46 at the same time that the electronic information signals from the first select grouping of red, green and blue ($\overline{RGB}$) light sensitive pixels from the shift register 30 are recorded by the recording head 44 onto the second magnetic track 48. The signal processing circuit 34 operates in a well-known manner to derive the luminance and chrominance components of the electronic information signals and to modulate the luminance and chrominance components onto appropriate subcarriers. The recording heads 42 and 44 may comprise two different and distinct recording heads or, alternatively, may comprise a single dual recording head comprising an in-line double gap head as disclosed in an article entitled "An Electronic Still Camera Technology", by Kentaro Hanma et al., Consumer Products Research Center, Hitachi Limited.

As previously discussed, the recently proposed standardized storage medium for an electronic still image camera comprises a 47 mm magnetic floppy disk on which still images are recorded. The proposed specifications for the standard 47 mm magnetic floppy disk provide for a luminance bandwidth 4.5 MHz. This specification makes it possible to store a scan line of approximately 212 TV lines resolution.

Figure 3A:
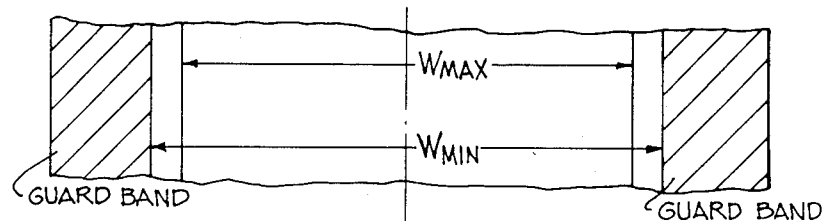
FIG. 3A is a plan view of a portion of the recording track of the proposed standard 47 mm magnetic floppy disk.
Figure 3B:
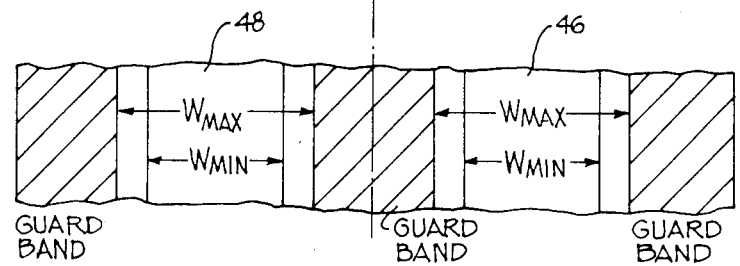
FIG. 3B is a plan view of a portion of the dual recording tracks recorded on the proposed standard 47 mm magnetic floppy disk by the system of claim 1.

Referring now to FIG. 3A there is shown a portion of the standard track for a 47 mm magnetic floppy disk in which the track width is between 0.072 to 0.08 mm with a guard band of 0.02 mm on each side thereof. In the electronic still image camera and playback system of this invention, dual magnetic recording tracks 46 and 48 are configured as shown in FIG. 3B to fit within the envelope or footprint of the aforementioned standard track. Thus, the width of each of the tracks 46 and 48 is preferably within the range of 0.022 mm to 0.03 mm with a guard band therebetween of 0.02 mm.

The duplex head comprising the dual recording heads 42 and 44 constructed in the aforementioned manner can record simultaneously on the two parallel subtracks 46 and 48 within the footprint or envelope of the standard track. The duplex head can be fabricated by well-known thin film processes wherein magnetic, conductive ard insulating layers are successively deposited by vacuum deposition or plating and the various structures are defined by conventional photolithographic means. The duplex head consists of two complete heads as shown schematically at 42 and 44 with as many common elements as possible configured so that the gaps of the respective heads are in-line along the radius and operate independently without substantial cross talk. As previously discussed, a similar head is disclosed in the aforementioned Hanma et al. reference to read two adjacent standard tracks of the type shown in FIG. 3A in order to allow still framing of an entire frame without moving the head radially where the frame consists of two fields recorded, respectively, on adjacent standard tracks. As is readily apparent, this head could also be scaled to read the two adjacent subtracks of FIG. 3B within the envelope or footprint of the standard track as shown in FIG. 3A.

The aforementioned 50% reduction in the rate at which electronic information signals are clocked from the shift register 22 to the shift registers 26 and 30 provides a corresponding 50% reduction in the actual band-width of the electronic information signals clocked to each shift register 26 and 30, respectively. Each of the magnetic recording tracks 46 and 48 has a 5 MHz bandwidth thereby accommodating the recording of electronic information signals for twice the number of horizontal light sensitive pixels or cells in view of the aforementioned 50% reduction in the electronic information signal bandwidth. In this manner, two-dimensional photoresponsive CCD arrays having twice the number of horizontal light sensitive elements or pixels than heretofore possible may be compatible for use in electronic image still cameras of the type in which electronic image data is recorded on the standard 47 mm magnetic floppy disk.

Playback is accomplished by reading the tracks 46 and 48, respectively, with playback heads 50 and 52. Playback heads 50 and 52 may also comprise a duplex head of the aforementioned type. The electronic information signals retrieved by the playback heads 50 and 52 are directed, respectively, to a signal processing circuit 56 which operates to transform the electronic information signals into the appropriate format such as NTSC, PAL, etc. for display on the screen of a CRT or the appropriate format for printing a hard copy. Clock signals, in turn, are recovered from the electronic information signals by a clock recovery circuit 58 which, in turn, operates by way of a pair of phase shift circuits 60, 62 to control the phase shift sampling of the electronic information signals from the signal processing circuit by way of sampler circuits 64 and 66, respectively. As will be well understood, since the electronic information signals corresponding to the light sensitive elements or pixels 16 of the two-dimensional photoresponsive array 12 must be interleaved by shift registers to reestablish the same sequential order in which the electronic information signals were originally retrieved from the photoresponsive array 12, it becomes necessary to sample the analog electronic information signals. It will be readily understood that whereas the system has been described in regard to storing analog electronic information signals, it will be equally apparent that such signals could be converted to a digital format prior to storage on the magnetic data tracks 46 and 48 in which case such sampling would not be required.

The electronic information signals from the sampler circuit 66, in turn, are directed to input a shift register 72 comprising a plurality of linearly arranged cells 74. In like manner, the electronic information signals from the sampler circuit 64 are directed to another shift register 68 comprising a plurality of linearly arranged cells 70. The electronic information signals stored by the shift registers 68 and 72, in turn, are directed for storage in a shift register 76 comprising a plurality of linearly arranged cells 78. As is readily apparent the electronic information signals for the first red, green, blue (RGB) select grouping of photosensitive pixel elements are directed from the shift register 68 for storage in the first three cells 78 of the shift register 76. The electronic information signals corresponding to the second select grouping of red, green and blue (RGB) photosensitive pixel elements are directed, in turn, from the shift register 68 for storage in the seventh, eighth and ninth cells 78 of the shift register 76. In like manner, the electronic information signals corresponding to the first select grouping of red, green and blue ($\overline{RGB}$) photosensitive pixel elements are directed from the shift register 72 for storage in the fourth, fifth and sixth cells 78 of the shift register 76. In like manner, the electronic information signals corresponding to the second select grouping of red, green and blue ($\overline{RGB}$) photosensitive pixel elements are directed from the shift register 72 for storage in the tenth, eleventh and twelvth cells 78 of the shift register 76.

Thus, in this manner electronic information signals from the shift registers 68 and 72, respectively, are interleaved into the shift register 76 to establish the same consecutive succeeding order in which the electronic information signals were originally retrieved from the photoresponsive array 12. As is readily apparent, the electronic information signals corresponding to the select groupings of photosensitive pixel elements are stored in the same consecutive order in the shift register 76 as originally stored in the shift register 22. Again, the cells 70 and 74 of the shift registers 68 and 72, respectively, are twice as long as the cells in the shift register 76 requiring a clocking rate which is substantially 50% that which would otherwise be required if the electronic information signals were transferred serially without the interleaving of alternate select groupings of light sensitive cells or pixels. The electronic information signals stored in the shift register 76 may thereafter be transferred to any conventional printer from which a hard copy may be made in a well-known manner or other display such as a cathode ray tube.

Figure 2:
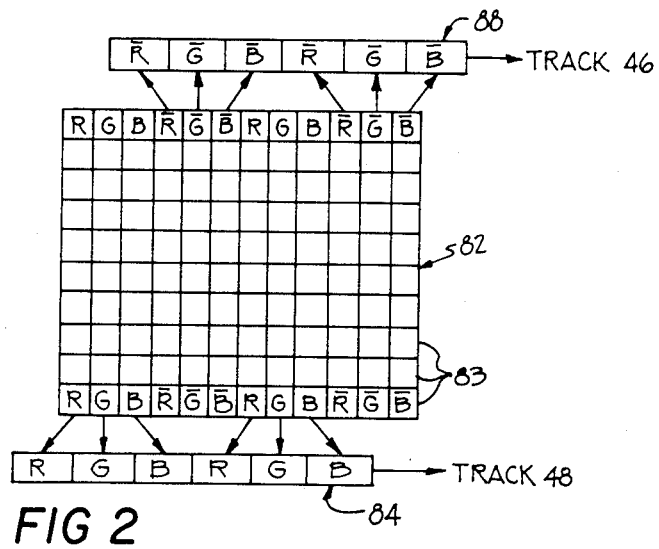
FIG. 2 is a schematic block diagram for an alternate embodiment of a portion of the schematic block diagram of FIG. 1.

Referring now to FIG. 2 there is shown an alternate arrangement for retrieving electronic information signals from a photoresponsive array 82 of the interline transfer type. The two-dimensional photoresponsive array 82 comprises a plurality of light sensitive elements or pixels 83 arranged in horizontal rows and vertical columns with the same light filter stripes as described in relation to the photoresponsive array 12 of FIG. 1. Thus, the light sensitive elements or pixels 83 are arranged in select groupings of red, green and blue light sensitive pixels which are transferred ultimately in opposite directions to shift registers 84 and 88. The electronic information signals corresponding to the alternate groupings of light sensitive elements or pixels 83 are thereafter transferred in a serial fashion from the shift registers 88 and 84 for recording and subsequent retrieval from the magnetic tracks 46 and 48.

In this manner there is provided an electronic still image camera and playback system in which a high resolution image having, for example, twice the number of pixels per line may be recorded on a standard 47 mm magnetic floppy disk without changing the media standard. This invention thus allows the display or printing of an image with double the horizontal line resolution which could heretofore be accomplished using the standard media. In addition, if the magnetic recording is provided on subtracks as shown in FIG. 3B within the footprint or envelope of the standard track, backward compatible readout can be provided in the standard format by reading both tracks simultaneously. If both of the recording tracks 46 and 48 are of standard width, backward compatible readout can be accomplished by reading only one of the tracks.

Although the system has been described in regard to using a charge coupled device (CCD) for the photoresponsive array 12, it will be well understood that other two-dimensional photoresponsive arrays may also be utilized such as charge injection devices (CID) and photodiode arrays. In addition, the system has been described as recording only a single television field, however, it will be readily apparent that the system could also be utilized to record alternate fields in which case one signal processor 34 would operate to sort electronic information signals from alternate rows of the photoresponsive array 12 into alternate fields. The electronic information signals for each field would then be recorded onto a respective one of two pairs of recording tracks each pair of which would be the same as the magnetic tracks 46, 48.

Since certain other changes may be made in the above-described embodiments without departing from the scope of the invention herein involved, it is intended that all matter contained in the above description are shown in the accompanying drawings and may be interpreted as illustrative and not in a limiting sense.

What is claimed is:

1. An electronic still image camera of the type in which image defining electronic information signals may be stored on at least two tracks of a nonphotographic storage medium comprising:
    a photoresponsive two-dimensional array comprising a plurality of light sensitive elements or pixels each of which provides an electronic information signal corresponding to the intensity of the scene light incident thereto;
    means operatively associated with said photoresponsive array for filtering the scene light incident to each of said light sensitive pixels in a manner whereby each light sensitive pixel in each of a plurality of adjacent select groupings of light sensitive pixels receives scene light filtered at different select ranges of wavelengths;
    electronic information signal shifting means connected for transferring the electronic information signals from the light sensitive pixels in first alternate ones of said select groupings of light sensitive pixels; and in second alternate ones of said select groupings of light sensitive pixels, said second alternate ones of said select groupings of light sensitive pixels being interspaced, respectively, between said first alternate ones of said select groupings of light sensitive pixels; and
    means for recording the electronic information signals transferred from said first alternate ones of said select groupings of light sensitive pixels by said electronic information signal shifting means onto a first track of the storage medium and for recording the electronic information signals transferred from said second alternate ones of said select groupings of light sensitive pixels by said electronic information signal shifting means onto a second track of the storage medium wherein each of said light sensitive pixels in said photoresponsive array comprises a cell which accumulates charge packets responsive to incident scene light and said electronic information signal shifting means comprises a plurality of cells which are substantially twice the length of said cells in said photoresponsive array and the rate at which said charge packets are transferred to said electronic information shifting means is substantially half the rate of transfer required if each one of said select groupings of photosensitive pixel elements were recorded in consecutive succeeding order on a single track.

2. The camera of claim 1 wherein said electronic information signal shifting means comprises a first shift register for transferring the electronic information signals in said first alternate ones of said select groupings of light sensitive pixels and a second shift register for transferring the electronic information signals in said second alternate ones of said select groupings of light sensitive pixels.

3. The camera of claim 2 including means for shifting the phase of said electronic information signals from said first and second shift registers to insure that electronic information signals corresponding to adjacent select groupings of light sensitive pixels are recorded simultaneously on said first and second tracks, respectively.

4. The camera of claim 2 wherein: the storage medium is a standard magnetic recording medium for a camera having a luminance bandwidth of 4.5 MHz and information is recorded on a standard track having a width within the range of 0.072 to 0.080 mm and a guard band on each side thereof in the order of 0.02 mm, and said recording means comprises a dual recording head for recording simultaneously the electronic information signals transferred by said first and second shift registers on two parallel subtracks within the boundary of the standard track, the subtracks each having a width between 0.022 and 0.030 mm with a guard band in the order of 0.02 therebetween.

5. The camera of claim 2 wherein each of said select groupings of light sensitive pixels comprises three light sensitive pixels and said filtering means operates to filter light incident to: a first of said three light sensitive pixels in each of said select groupings of light sensitive pixels such that said first light sensitive pixel receives green scene light, a second of said three light sensitive pixels in each of said select groupings of light sensitive pixels such that said second light sensitive pixel receives red scene light, and a third of said three light sensitive pixels in each of said select groupings of light sensitive pixels such that said third light sensitive pixel receives blue scene light.

6. An electronic still image camera and playback system of the type in which image defining electronic information signals may be stored on at least two tracks of a nonphotographic storage medium comprising:

a photoresponsive two-dimensional array comprising a plurality of light sensitive elements or pixels each of which provides an electronic information signal corresponding to the intensity of the scene light incident thereto;

means operatively associated with said photoresponsive array for filtering the scene light incident to each of said light sensitive pixels in a manner whereby each light sensitive pixel in each of a plurality of adjacent select groupings of light sensitive pixels receives scene light filtered at different select ranges of wavelengths;

first electronic information signal shifting means for transferring the electronic information signals out from the light sensitive pixels in first alternate ones of said select groupings of light sensitive pixels and in second alternate ones of said select groupings of light sensitive pixels, said second alternate ones of said select groupings of light sensitive pixels being interspaced, respectively, between said first alternate ones of said select groupings of light sensitive pixels;

means for recording the electronic information signals transferred from said first alternate ones of said select groupings of light sensitive pixels by said electronic information shifting means on a first track of the storage medium and for recording the electronic information signals transferred from said second alternate ones of said select groupings of light sensitive pixels by said electronic information signal shifting means onto a second track of the storage medium;

means for retrieving the electronic information signals from the first and second tracks of the storage medium; and second electronic information shifting means for receiving the electronic information signals retrieved from the first and second tracks of the storage medium and combining the retrieved electronic information signals in a manner whereby the electronic information signals corresponding to the light sensitive pixels in said first alternate ones of said select groupings of light sensitive pixels and the electronic information signals corresponding to the light sensitive pixels in said second alternate ones of said select groupings of light sensitive pixels are arranged in the same consecutive order in which said electronic information signals were initially transferred out of said photoresponsive array.

7. The system of claim 6 wherein said first electronic information signal shifting means comprises a first shift register for transferring the electronic information signals in said first alternate ones of said select groupings of light sensitive pixels and a second shift register for transferring the electronic information signals in said second alternate ones of said select groupings of light sensitive pixels and said second electronic information signal shifting means comprises: a third shift register, a fourth shift register connected to receive the electronic information signals retrieved from the first track of the storage medium and operatively connected to said third shift register to transfer thereto the retrieved electronic information signals in a manner whereby the electronic information signals corresponding to the light sensitive pixels in said first alternate ones of said select groupings of light sensitive pixels are stored successively in first alternately spaced apart regions of said third shift register, and a fifth shift register connected to receive the electronic information signals retrieved from the second track of the storage medium and operatively connected to said third shift register to transfer thereto the retrieved electronic information signals in a manner whereby the electronic information signals corresponding to the light sensitive pixels in said second alternate ones of said select groupings of light sensitive pixels are stored successively in second alternately spaced apart regions interspaced, respectively, between said first alternately spaced apart regions of said third shift register, said third shift register thereafter storing said electronic information signals in the same consecutive order in which said electronic information signals were initially transferred out of said photoresponsive array.

8. The system of claim 7 wherein: each of said light sensitive pixels in said photoresponsive array comprises a cell which accumulates charge packets responsive to incident scene light, said third shift register comprises a plurality of cells which are substantially the same length as said cells in said photoresponsive array, said first, second, fourth and fifth shift registers each comprise a plurality of cells which are substantially twice the length of said cells in said photoresponsive array, and the rate at which said charge packets are transferred to said first, second, fourth and fifth shift registers is substantially half the rate of transfer required if each one of said select groupings of photosensitive pixel elements were recorded and retrieved in consecutive succeeding order.

9. The system of claim 8 including means for shifting phase of said electronic information signals from said first and second shift registers to insure that said electronic information signals corresponding to adjacent select groupings of light sensitive pixels are recorded simultaneously on said first and second tracks, respectively, and means for shifting the phase of said electronic information signals transferred to said fourth and fifth shift registers to insure that said electronic information signals are stored in said third shift register in the same consecutive order in which said electronic information signals were initially transferred out of said photoresponsive array.

10. The system of claim 8 wherein: the storage medium is a standard magnetic recording medium for a camera having a luminance bandwidth of 4.5 MHz, and information is recorded on a standard track having a width within the range of 0.072 to 0.080 mm and a guard band on each side thereof in the order of 0.02 mm, said recording means comprises a dual recording head for recording simultaneously the electronic information signals transferred by said first and second shift registers on two parallel subtracks within the boundary of the standard track, the subtracks each having a width between 0.022 and 0.030 mm with a guard band in the order of 0.02 mm therebetween, and said retrieving means comprises a dual playback head for retrieving simultaneously the electronic information signals recorded on the two parallel subtracks.

11. The system of claim 8 wherein each of said select groupsings of light sensitive pixels comprises three light sensitive pixels and said filtering means operates to filter light incident to: a first of said three light sensitive pixels in each of said select groupings of light sensitive pixels such that said first light sensitive pixel receives green scene light, a second of said three light sensitive pixels in each of said select groupings of light sensitive pixels such that said second light sensitive pixel receives red scene light, and a third of said three light sensitive pixels in each of said select groupings of light sensitive pixels such that said third light sensitive pixel receives blue scene light.

12. An electronic still image camera of the type in which image defining electronic information signals may be stored on at least two tracks of a nonphotographic storage medium comprising:

a photoresponsive two-dimensional array comprising a plurality of light sensitive elements of pixels arranged in horizontal rows and vertical columns wherein each of said light sensitive elements provides an electronic information signal corresponding to the intensity of the scene light incident thereto;

means operatively associated with said photoresponsive array for filtering the scene light incident to each of said light sensitive pixels in a manner whereby each light sensitive pixel in each of a plurality of adjacent select groupings of light sensitive pixels in each horizontal row receives scene light filtered at different select ranges of wavelength;

electronic information signal shifting means connected for transferring the electronic information signals from the light sensitive pixels in first alternate ones of said select groupings of light sensitive pixels; and in second alternate ones of said select groupings of light sensitive pixels, said second alternate ones of said select groupings of light sensitive pixels being interspaced, respectively, between said first alternate ones of said select groupings of light sensitive pixels in each horizontal row; and means for recording the electronic information signals transferred from said first alternate ones of said select groupings of light sensitive pixels by said electronic information signal shifting means onto a first track of the storage medium and for recording the electronic information signals transferred from said second alternate ones of said select groupings of light sensitive pixels by said electronic information signal shifting means onto a second track of the storage medium.

* * * * *